No. 727,695. PATENTED MAY 12, 1903.
A. B. SALIGER.
ARTICLE OF APPAREL.
APPLICATION FILED AUG. 16, 1902.
NO MODEL.
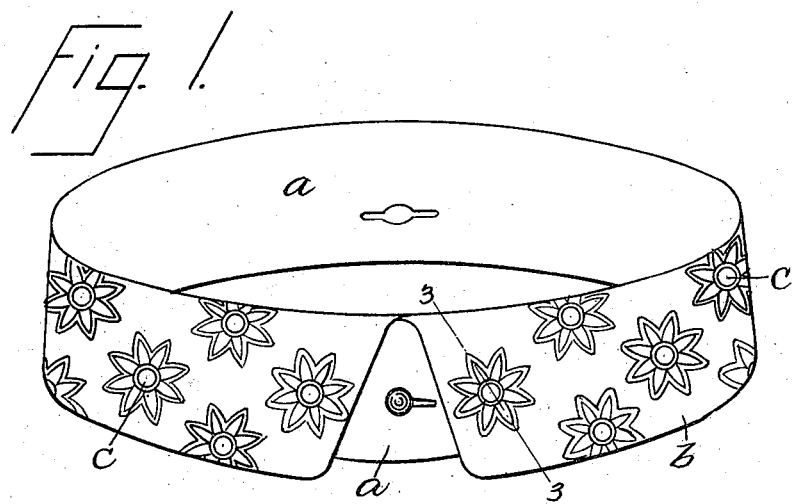
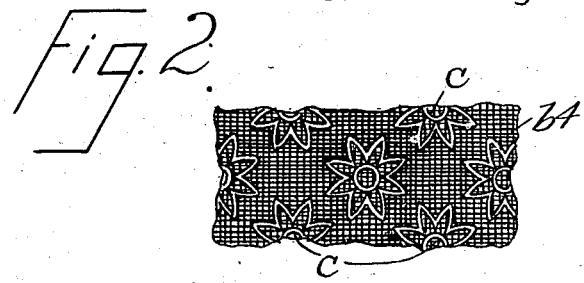
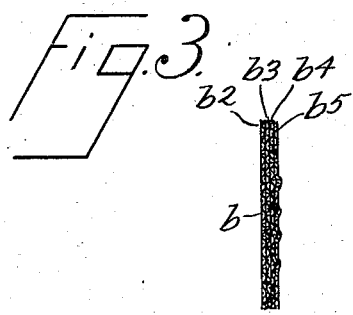
WITNESSES
INVENTOR
Alois B. Saliger.
BY
Edgar Tate & Co
ATTORNEYS No. 727,695. Patented May 12, 1903.

UNITED STATES PATENT OFFICE.

ALOIS B. SALIGER, OF NEW YORK, N. Y., ASSIGNOR OF ONE-HALF TO MARIE V. GEHRING, OF PHILADELPHIA, PENNSYLVANIA.

ARTICLE OF APPAREL.

SPECIFICATION forming part of Letters Patent No. 727,695, dated May 12, 1903.

Application filed August 16, 1902. Serial No. 119,907. (No model.)

*To all whom it may concern:*

Be it known that I, ALOIS B. SALIGER, a citizen of the United States, residing at New York, in the county of New York and State of New York, have invented certain new and useful Improvements in the Manufacture of Articles of Apparel, of which the following is a full and complete specification, such as will enable those skilled in the art to which it appertains to make and use the same.

The object of this invention is to provide a collar or other article of apparel having ornamental raised figures on the outer surface when such article of apparel is laundered; and with this and other objects in view the invention consists in an article of apparel constructed as hereinafter described and claimed.

The invention is fully disclosed in the following specification, of which the accompanying drawings form a part, in which the separate parts of my improvement are designated by suitable reference characters in each of the views, and in which—

Figure 1 is a front perspective view of a collar made according to my improved process; Fig. 2, a front view of one thickness of the material from which the collar is made, and Fig. 3 a partial section on the line 3 3 of Fig. 1.

In the drawings forming part of this specification I have shown an ordinary turn-down collar comprising a neckband portion $a$ and a turn-down portion $b$, which forms the exposed part of the collar or the collar proper, and in Fig. 3 of the drawings I have shown a section of this turn-down portion $b$ or of the collar proper. In forming the part $b$ of the collar I provide a plurality of thicknesses or layers of material, and in the form of construction shown these thicknesses or layers of material are four in number and consist of an inner thickness or layer $b^2$, two intermediate thicknesses or layers $b^3$ and $b^4$, and an outer thickness or layer $b^5$. The two inner thicknesses or layers $b^2$ and $b^3$ may be composed of any desired material, while the outer layer $b^5$ is composed of linen in the usual manner, and the thickness or layer $b^4$ adjacent to the outer thickness or layer $b^5$ may be composed of any suitable material and is provided on its outer side with raised and ornamental figures $c$ of any desired shape or configuration, and said figures are formed on the thickness or layer $b^4$ by the ordinary process of embroidery or may be embroidered separately on any suitable material and then cut out and secured to the thickness or layer $b^4$, or said thickness or layer $b^4$ may consist of lace having the figure $c$ formed thereon in the usual or by any desired process, the object being to provide a collar or other article of apparel which when laundered and ready for use, as herein described, will have an embossed appearance and be provided with raised figures of ornamentation.

When a collar or other article of apparel made according to this invention is laundered, the figures $c$ will show on the outside, the outer layer $b^5$ of linen being pressed into the figures and being given the usual smooth surface between said figures, while the figures themselves project or show distinctly in outline in the same manner as though they were sewed on or formed on the outer surface.

My invention is not limited to the number of thicknesses of which the collar or other article of apparel is made, and it will be apparent that two or more of such thicknesses may be employed, and if but two thicknesses are employed the inner thickness or that over which the outer thickness or layer $b^5$ is placed would necessarily be made of thick or heavy material, so as to give the collar or other article of apparel proper form and stiffness when laundered, and in this event the ornamental figures would have been formed thereon or secured thereto.

Although I have only shown my invention applied to a collar, it will be apparent that the same may be applied in the manufacture of cuffs, shirt-bosoms, and various other articles of apparel.

Having fully described my invention, what I claim as new, and desire to secure by Letters Patent, is—

An article of apparel composed of a plurality of thicknesses or layers of material, the thickness or layer of material adjacent to the outer thickness or layer being provided with a plurality of raised and ornamental figures, substantially as shown and described.

In testimony that I claim the foregoing as my invention I have signed my name, in presence of the subscribing witnesses, this 7th day of July, 1902.

ALOIS B. SALIGER.

Witnesses:
C. E. MULREANY,
F. A. STEWART.